United States Patent
Dolbier, Jr. et al.

(10) Patent No.: US 7,544,765 B2
(45) Date of Patent: Jun. 9, 2009

(54) METHODS FOR PRODUCING THERMOPLASTIC FLUOROPOLYMERS

(75) Inventors: William R. Dolbier, Jr., Gainesville, FL (US); Lotfi Hedhli, King of Prussia, PA (US); Maher Elsheikh, Wayne, PA (US); Valerie Rodriguez-Garcia, Irvine, CA (US); Kai Wu, Estill, SC (US)

(73) Assignees: University of Florida Research Foundation, Inc., Gainesville, FL (US); Arkema Inc., Philadelphia, PA (US)

( * ) Notice: Subject to any disclaimer, the term of this patent is extended or adjusted under 35 U.S.C. 154(b) by 475 days.

(21) Appl. No.: 11/546,729

(22) Filed: Oct. 12, 2006

(65) Prior Publication Data

US 2008/0090992 A1 Apr. 17, 2008

(51) Int. Cl.
*C08G 79/14* (2006.01)

(52) U.S. Cl. .................. 528/397; 528/401; 528/425; 528/373

(58) Field of Classification Search .................. 528/397, 528/401
See application file for complete search history.

(56) References Cited

U.S. PATENT DOCUMENTS

| | | | |
|---|---|---|---|
| 3,065,205 A | 11/1962 | Bonner, Jr. | |
| 3,220,910 A | 11/1965 | Walkey | |
| 3,332,891 A * | 7/1967 | Chow et al. .................. | 528/391 |
| 4,108,837 A | 8/1978 | Johnson et al. | |
| 4,175,175 A | 11/1979 | Johnson et al. | |
| 4,400,499 A | 8/1983 | Colon | |
| 5,536,892 A | 7/1996 | Dolbier, Jr. et al. | |
| 5,841,005 A | 11/1998 | Dolbier, Jr. et al. | |
| 5,849,962 A | 12/1998 | Dolbier, Jr. et al. | |
| 6,150,499 A | 11/2000 | Dolbier, Jr. et al. | |
| 6,284,933 B1 | 9/2001 | Dolbier, Jr. et al. | |
| 6,392,097 B1 | 5/2002 | Dolbier, Jr. et al. | |

FOREIGN PATENT DOCUMENTS

| | | |
|---|---|---|
| JP | 2001077396 | 3/2001 |
| JP | 2004075548 | 3/2004 |
| JP | 2005183729 | 7/2005 |
| WO | WO 2006/022403 | 3/2006 |
| WO | WO 2006022403 A1 * | 3/2006 |

OTHER PUBLICATIONS

Johnson, R. N. et al., "Poly(aryl Ethers) by Nucleophilic Aromatic Substitution. III. Hydrolytic Side Reactions," *Journal of Polymer Science: Part A-1*, 1967, vol. 5, pp. 2415-2427.

Mecham, S. J. et al., "Controlled Molecular Weight Amorphous Aromatic Polyester Via Melt Acidolysis," *Polymer Preprints*, 1997, vol. 38, No. 2, pp. 400-401.

Zolotukhin, M. G. et al., "Aromatic polymers obtained by precipitation polycondensation, 2$^{a)}$: Synthesis of poly(ether ketone ether ketone ketone) (PEKEKK)$^{b)}$," *Macromolecular Chemistry and Physics*, 1997, vol. 198, pp. 1131-1146.

Bunnett and Creary, "Arylation of Arenethiolate Ions by the $S_{RN}1$ Mechanism. A Convenient Synthesis of Diaryl Sulfides," *Journal of Organic Chemistry*, 1974, p. 3173-3174, vol. 39, No. 21.

Dukes et al., Useful Model Systems for the Study of $S_{RN}1$ Chemistry in the Synthesis of Poly(arylene ether ketone)s, *Macromolecules*, 1996, pp. 3081-3089, vol. 29, No. 9.

Fahey and Ash, "Mechanism of Poly(p-phenylene sulfide) Growth from p-Dichlorobenzene and Sodium Sulfide," *Macromolecules*, 1991, pp. 4242-4249, vol. 24, No. 15.

Guidotti et al., "Reactions of (chlorodifluoromethyl)benzene and (chlorodifluoromethoxy)benzene with nucleophilic reagents," *Journal of Fluorine Chemistry*, 2005, pp. 445-449, vol. 126.

Kim and Bunnett, "Evidence for a Radical Mechanism of Aromatic "Nucleophilic" Substitution," *Journal of the American Chemical Society*, Dec. 1970, p. 7463-7464, vol. 92, No. 25.

Percec et al., "Reductive Dehalogenation versus Substitution in the Polyetherification of 4,4'-Dihalodiphenyl Sulfones with Bisphenolates," *Macromolecules*, 1993, p. 3650-3662, vol. 26, No. 14.

* cited by examiner

*Primary Examiner*—David Wu
*Assistant Examiner*—Satya B Sastri
(74) *Attorney, Agent, or Firm*—Saliwanchik, Lloyd & Saliwanchik

(57) ABSTRACT

A process for producing a class of polyarylenes having p-bis-(chlorodifluoromethyl) benzene or p-bis(bromodifluoromethyl) benzene as a comonomer. The p-bis-(chlorodifluoromethyl) benzene or the p-bis(bromodifluoromethyl)benzene act as precursors in a polycondensation reaction with a difunctional monomer.

18 Claims, No Drawings

METHODS FOR PRODUCING THERMOPLASTIC FLUOROPOLYMERS

BACKGROUND OF THE INVENTION

Fluorinated polymers have outstanding properties for a wide variety of applications (*Fluoropolymers*, Wall L. Wiley, New York (1972); *Modern Fluoropolymers* (1997), Wiley, New York). They exhibit low surface energy, high thermostability and chemical resistance, low friction coefficient, and are resistant to UV. Because of their outstanding properties they find application in many areas including, for example, elastomers, paints and coatings, surfactants, the electronic industry, and others. Therefore, high-performance fluorinated polymers have been receiving considerable attention as interesting advanced materials.

Although a wide range of condensation monomers can be used in processes for preparing fluoropolymers, the use of partially fluorinated monomers is becoming increasingly attractive because it offers the combined benefits of fluorinated groups (low surface tension, chemical resistance, acid resistance, water repellency, etc.) and aromatic polymers (thermal stability, excellent mechanical properties, etc.).

Dolbier et al. in U.S. Pat. Nos. 6,150,499; 5,536,892; 6,392,097; and 5,849,962, disclosed novel ways to prepare octafluoro-[2,2]paracylophane (AF4) and AF4 derivatives. Furthermore, in U.S. Pat. No. 5,841,005, Dolbier et al. disclosed an improved route to prepare AF4 from various different 1,4 bis(halo difluoro methyl)benzene where the halogen is bromo, chloro or iodo.

In U.S. Pat. No. 6,284,933, Dolbier et al. disclosed the synthesis of 1,1'4,4' tetrafluoro paraxylene (TFPX) and described the use of TFPX-dibromide to make homopolymer of AF4.

Guidotti and Wakselman in the *Journal of Fluorine Chemistry*, 2005, 126, 445-449 disclose condensation reactions of the mono substituted compounds bromo and (chlorodifluoromethyl)benzene.

Although several fluorinated monomers have been described in the literature, neither p-bis-(chlorodifluoromethyl)benzene nor p-bis(bromodifluoromethyl)-benzene have been reported as monomers from which a condensation polymer is derived. Because of the aromatic nature of p-bis-(chlorodifluoromethyl)benzene and p-bis(bromodifluoromethyl)-benzene the resulting copolymers can have properties similar to poly(aryl ethers), depending on the nature of the comonomer.

Poly(aryl ethers) are tough linear polymers that possess a number of attractive features such as excellent thermal and chemical stability, high glass transition temperatures, good electrical properties, and very good hydrolytic stability. The primary classes of poly(aryl ethers) are poly(aryl ether ketone)s, poly(aryl ether sulfone)s and poly(thio ether)s. They can be synthesized from a variety of starting materials. Over the years, an abundant scientific and patent literature has developed directed to the formation and properties of poly (aryl ethers).

Some early work (U.S. Pat. No. 3,065,205) involves the electrophilic aromatic substitution (viz. Friedel-Crafts) reaction of aromatic diacylhalides with unsubstituted aromatic compounds such as diphenyl ether. Another approach later developed involved a nucleophilic aromatic substitution reaction of an activated aromatic dihalide and an aromatic diol (Journal of Polymer Science, A-1, Vol. 5, 1967, pp. 2415-2427; U.S. Pat. No. 4,108,837 and U.S. Pat. No. 4,175,175).

Poly(aryl ether ketone)s (PEK) are linear aromatic polymers that are widely used in products ranging from optical lenses to computer chips because of their strength, thermal durability, and high glass transition temperatures. PEK can be synthesized by electrophilic Friedel-Crafts acylation condensation of 1,4-diphenoxy benzophenone with terephthaloyl chloride. The syntheses are performed as precipitation polycondensations, and the polyketones are obtained in particle form (*Macromolecular Chemistry and Physics,* 1997, volume 198 (4) pp 1131-1146).

Poly(ether ether ketone) (PEEK) can be prepared from Bisphenol A and difluorobenzophenone. This polymer is highly crystalline, thermally stable, resistant to many chemicals, and very durable.

In the following example, Bisphenol A, in presence of a strong base such as NaOH undergoes a deprotonation step:

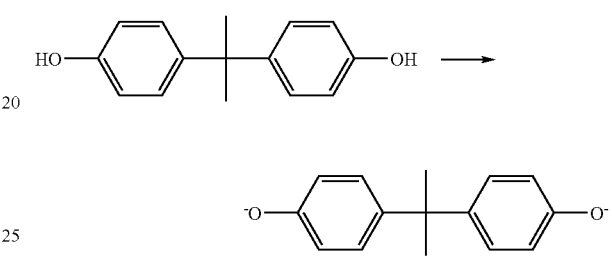

and the resulting bisphenolate can be in turn reacted with difluorobenzophenone to form PEEK.

Poly(ether ether sulfone) has a PEEK structure in which the carbonyl group is replaced by a sulfonyl group. Poly(ether ether sulfone), because of its amorphous nature, can be processed at lower temperatures than PEEK. Poly(aryl ether sulfone)s display many desirable characteristics, including: durability, thermal, hydrolytic and dimensional stability, low coefficient of thermal expansion, retention of modulus to temperatures approaching Tg, and radiation resistance.

Poly(phenylenes)sulfide (PPS), a poly(thio ether), is a material of great commercial importance because of its excellent chemical and thermal resistance, fire retardancy properties, and high mechanical strength.

Several routes can be used to prepare poly(aryl ether sulfone) and poly(aryl ether ketone)s. The most common routes involve nucleophilic polycondensation; electrophilic (Friedel-Crafts) route, such as the reaction of diacyl halides with aromatic reaction of diacyl halides with aromatic hydrocarbons, catalyzed by a Lewis acid; and radical nucleophilic substitution. Additional routes have been described in the literature. For example, the Ullman polymerization (U.S. Pat. No. 3,220,910, and *Polymer Preprints*, Vol. 28, No. 1, pp. 180-182 (1987)) involves the self condensation of a monomer containing both an halogen moiety and an alcohol moiety. Poly(aryl ether)polymers were also prepared by the nickel catalyzed coupling of aryl polyhalides as described in U.S. Pat. No. 4,400,499. The catalyst comprises a nickel compound and at least one ligand such as triarylphosphine; and an aromatic bidentate compound containing at least one ring nitrogen atom.

Among the widely accepted mechanisms for these types of polycondensation are the aromatic nucleophilic substitution $S_NAr$, and the radical nucleophilic substitution $S_{RN}1$. $S_NAr$ is a two step mechanism in which the nucleophile attacks the activated site to form a resonance stabilized arenium ion intermediate, which is usually the rate determining step, followed by the departure of the leaving group and results in reformation of aromaticity in the ring. The groups known to activate $S_NAr$ are strong electron withdrawing groups with electronegative atoms that can accept the electron density coming from the nucleophile. On the other hand, the $S_{RN}1$ mechanism is a well established mechanism and is recognized as one of the primary possible mechanisms in aromatic nucleophilic substitution (Bunnett, J. F, *J. Am. Chem. Soc.* 1970, 92, 7463; and Bunnett, J. F, Creary, X., *J. Org. Chemistry* 1974, 39, 3173). $S_{RN}1$ mechanism and the factors affecting it are further described in a recent publication from Forbes et al. (*Macromolecules,* 1996, 29, 3081-89; K. Dukes, M. Forbes, A. Jeevarajan, J. DeSimone, R. Linton, V. Sheares).

Depending on the comonomer choice and reaction conditions, the reaction could follow $S_NAr$ mechanism, $S_{RN}1$ mechanism, or there could be in some instances a competition between $S_NAr$ and $S_{RN}1$ mechanisms. (*Macromolecules* (1993), 26, 3650; Percec, Rinaldi, Litman; "Reductive dehalogenation versus substitution in polyetherification of 4,4' dihalo diphenyl sulfone with bisphenol A.")

For example, while it is established that the dominant chain-growth mechanism in PPS preparation is $S_NAr$, Fahey and Ash (Darryl R. Fahey' and Carlton E. Ash, *Macromolecules* 1991, 24, 4242-4249) note that support for a minor competing $S_{RN}1$ reaction that might underlie the $S_NAr$ mechanism is found when PPS polymerizations are carefully analyzed, and therefore anomalies in the synthesis of PPS should not be overlooked.

Therefore, it is rather difficult to predict that the copolymerization between p-bis-(chlorodifluoromethyl)benzene or p-bis(bromodifluoromethyl)benzene and a diol or dithiol monomer will occur. Rather, the copolymerization between p-bis-(chlorodifluoromethyl)benzene or p-bis(bromodifluoromethyl)benzene and a diol or dithiol monomer requires the selection of specific monomers and specific reaction conditions that favor the polymerization. Furthermore because of the different electronic environment, it is even more difficult to predict the copolymerization success when the halogen atom is on a fluorinated group.

BRIEF SUMMARY OF THE INVENTION

The subject invention provides novel fluoropolymers. Specifically exemplified herein are new fluoropolyethers and thioethers that have been prepared via the condensation polymerization of diphenolates and dithiolates with a 1,4-bis(halodifluoromethyl)benzene.

In a specific embodiment, the subject invention provides a novel class of polyarylenes that have p-bis-(chlorodifluoromethyl)benzene or p-bis(bromodifluoromethyl)benzene as a comonomer.

The subject invention further provides novel polymer synthesis procedures including condensations that are believed to proceed by $S_{RN}1$ mechanistic pathways.

DETAILED DESCRIPTION OF THE INVENTION

The present invention provides a novel family of copolymers that have p-bis-(halodifluoromethyl)benzene as a moiety. Most preferably, The present invention provides a novel family of copolymers that have p-bis-(chlorodifluoromethyl)benzene or p-bis(bromodifluoromethyl)benzene as a moiety. The copolymers prepared show good solubility in common solvents and exhibit good thermal stabilities depending on the structures.

In one aspect of the present invention, p-bis-(chlorodifluoromethyl)benzene and p-bis(bromodifluoromethyl)benzene are precursors in a polycondensation reaction that yields novel copolymers, such as shown in the general equation below:

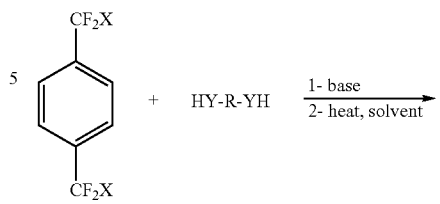

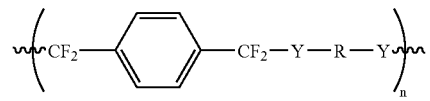

wherein X is Br or Cl and Y is O or S, R is any appropriate group as set forth herein.

In one embodiment, the subject invention provides:

a fluoropolymer prepared from a difunctional monomer plus a p-bis-(halodifluoromethyl)benzene comonomer, either alone or in combination with a dihalogenated monomer.

In a preferred embodiment, the copolymers of the present invention have:

a) p-bis-(chlorodifluoromethyl)benzene or p-bis-(bromodifluoromethyl)-benzene or mixtures thereof; and b) one or more di-halogenated monomer. In specific embodiments, the dihalogenated monomers can be described by the following formulae:

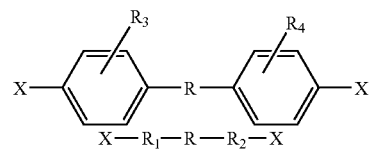

where X=Cl, Br, I, F;

R is a linear or branched alkyl chain, a heteroatom or a group (including CO, O, SO, $SO_2$, etc.);

$R_1$ and $R_2$ are linear or branched alkyl chains that can contain a heteroatom; and wherein $R_3$ and $R_4$ can be the same or different inert substituent groups such as hydrogen, alkyl groups (1-4 atoms), or a halogen atom (fluorine, bromine, iodine).

Unless otherwise specified, each aromatic group may incorporate a single aromatic ring, a fused ring system, or an unfused ring system; wherein a ring contains two or more aromatic moieties joined by bonds or divalent moieties such as an oxygen atom, a sulfur atom, or an alkyl group.

In the present invention the aromatic group is preferably a single six-membered ring. Each aromatic group may contain substituents such as halogens, alkoxy moieties, alkyl groups, or vinyl moities. More preferred substituents are either short alkyl groups (less than 4 carbon atoms) or a halogen.

Examples of such di-halogenated monomers include, but are not limited to, 4,4' dichlorobenzophenone, 4,4'difluorobenzophenone, 4,4'dibromobenzophenone, The di-halogenated monomer can be a linear or branched alkyl chain, which may include a heteroatom or a group (including, for example, CO, O, SO, $SO_2$, etc).

And c) one or more difunctional monomers that can be described by the following formulae:

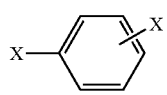 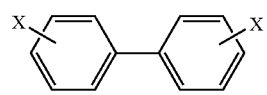

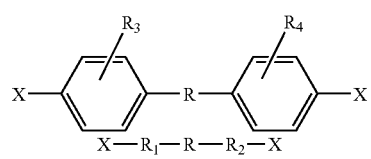

where X=OH, or SH where R is a linear or branched alkyl chain, a heteroatom or a group (including CO, O, SO, $SO_2$, etc.), where $R_1$ and $R_2$ are linear or branched alkyl chains that can contain a heteroatom, wherein $R_3$ and $R_4$ can be the same or different inert substituent groups such as hydrogen, alkyl groups (1-4 atoms), halogen atom (fluorine, chlorine, bromine, iodine).

Unless otherwise specified, each aromatic group may incorporate a single aromatic ring, a fused ring system, or an unfused ring system; wherein a ring contains two or more aromatic moieties joined by bonds or divalent moieties such as an oxygen atom, a sulfur atom, or an alkyl group.

In the present invention the aromatic group is preferably a single six-membered ring. Each aromatic group may contain substituents such as halogens, alkoxy moieties, alkyl groups, or vinyl moities. More preferred substituents are either short alkyl groups (less than 4 carbon atoms) or a halogen.

The difunctional monomer can be a linear or branched alkyl chain, which may include a heteroatom or a group (including CO, O, SO, $SO_2$, etc). Example of such difunctional monomer include but is not limited to 1,3-propanedithiol; 1,4 butane dithiol.

The polymerization can be carried out using known conventional methods of polycondensation. The polymerization can be conducted in bulk, solvent, dispersion or any other appropriate method. A preferred polymerization route is solution polymerization.

Similarly to what is practiced in the preparation of commonly known poly(arylene ether)s such as PEEK, PEK or PPS, the polymers of the subject invention can be obtained by using monomers with aromatic bromides but also with aryl iodides and chlorides.

The present invention can be performed following typical procedures to make poly(arylethers), poly(aryl ether ketone)s and poly(aryl ether sulfone)s. In one embodiment, the procedure involves the polycondensation of an activated dihalide monomer with a difunctional monomer such as dihydroxybenzophenone or Bisphenol A.

The synthesis can be conducted in the presence of light source such as a uv lamp.

The synthesis is preferably performed in the presence of a base and a polar aprotic solvent. Examples of polar aprotic solvents in which the polycondensation reaction can be conducted include, but are not limited to, dimethyl formamide (DMF), N-methyl pyrrolidinone (NMP), dimethylsulfoxide, dimethylsulfone, diphenylsulfone, DMEU and HMPA, or sulfolane.

The synthesis can be conducted in the presence of a strong base such as KOH or KH, and/or a weak base such as Na or K carbonate ($Na_2CO_3$, $K_2CO_3$). The alkali metal carbonates or bicarbonates generally used are selected from the group consisting of potassium, and cesium carbonates and bicarbonates. The alkali metal carbonates or bicarbonates should be anhydrous although, if hydrated salts are employed, where the polymerization temperature is relatively low, e.g., 100° to 250° C., the water should be removed, e.g., by heating prior to reaching the polymerization temperatures and/or using an azeotrope. The total amount of alkali metal carbonate or bicarbonate employed should be such that there is at least 1 atom of alkali metal for each phenol or thiol group. An excess of carbonate or bicarbonate may be employed, with the understanding that while it may be beneficial to the reaction rate, there is a risk of cleavage of the resulting polymer, particularly when using high temperatures. A mixed carbonate, for example sodium and potassium carbonate, may be employed.

The monomers can be added in batch or fed continuously, or any combination thereof.

Similar to what is known in the art, the ratio of the two monomers and/or addition of a mono-functional monomer can be practiced for controlling molecular weight and the polymer end groups. Examples of monofunctional monomers are thiophenol, 4-methylbenzene thiol, 4-aminobenzene thiol.

Among the monomers that can be polymerized with p-bis-(chlorodifluoromethyl)benzene or p-bis-(bromodifluoromethyl)benzene are diols, dithiol.

The diol monomers that can be polymerized with p-bis-(chlorodifluoromethyl)benzene or p-bis-(bromodifluoromethyl)benzene can include but are not limited to, 1,2-dihydroxy ethane, 1,3-dihydroxy propane, bisphenol A, 4,4'-dihydroxybiphenyl, 3,3'-dihydroxybiphenyl, hydroquinone, and m-cresol.

The dithiol monomers that can be polymerized with p-bis-(chlorodifluoromethyl)benzene or p-bis-(bromodifluoromethyl)benzene can include but are not limited to, ethane-1,2-dithiol, propane-1,3-dithiol, biphenyl-4,4'-dithiol, benzene-1,4-dithiol, benzene-1,3-dithiol, and alkyl-α,ω-dithiols.

The polymer may be recovered from the reaction mass in any convenient manner, such as by precipitation in a solvent, cooling or the reaction mass or by adding a non solvent for the polymer, or the solid polymer can be recovered by stripping off the solvent in a controlled manner.

Optionally, after the desired molecular weight has been attained, the polymer is treated with an activated aromatic halide or an aliphatic halide such as methyl chloride or benzyl chloride, in order to convert the terminal hydroxyl groups into ether groups.

Following are examples that illustrate procedures for practicing the invention. These examples should not be construed as limiting. All percentages are by weight and all solvent mixture proportions are by volume unless otherwise noted.

SYNTHESIS EXAMPLES

Example 1

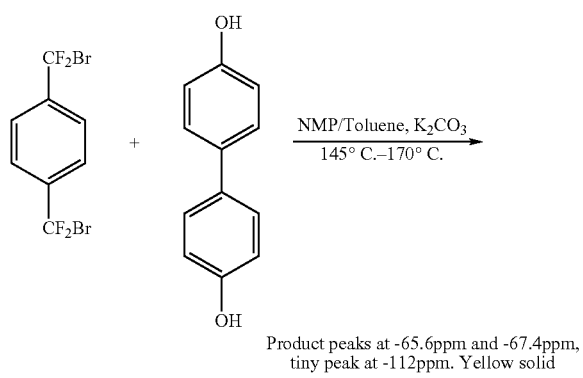

Product peaks at −65.6ppm and −67.4ppm, tiny peak at −112ppm. Yellow solid 4,4'-biphenol (5.41 g, 0.029 mol), 1,4-bis-(bromodifluoromethyl)benzene (9.78 g, 0.029 mol), $K_2CO_3$ (36.16 g, 0.26 mol), N-methylpyrrolidinone (84 mL) and toluene (126 mL) were added to a 500 mL round flask. A Dean-stark trap with 20 mL toluene was placed. The reaction mixture was stirred at 145° C. for 3 hrs. Then, it was heated at 170° C. for 4 hrs under $N_2$. After the reaction mixture was cooled to room temperature, it was added to water (2 L) dropwise with stirring. 1 M HCl was added to the solution until pH=1~2. The precipitate was collected and washed by water (300 mL), acetone (100 mL) and ethanol (100 mL). It was then dried by a flow of $N_2$ to give a yellow solid (10.21 g, 96%)

Example 2

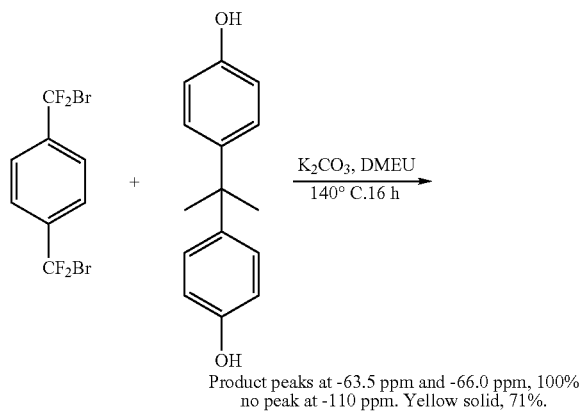

Product peaks at −63.5 ppm and −66.0 ppm, 100% no peak at −110 ppm. Yellow solid, 71%.

Bis-Phenol A (6.80 g, 0.030 mol), 1,4-bis-(bromodifluoromethyl)benzene (10.0 g, 0.030 mol), $K_2CO_3$ (40.80 g, 0.30 mol) and 1,3-dimethyl-2-imidazolidinone (350 mL) were added to a 500 mL round flask. The reaction mixture was stirred at 140° C. for 24 hrs under $N_2$. After the reaction mixture was cooled to room temperature, it was added to water (3 L) dropwise with stirring. 1 M HCl was added to the solution until pH=1~2. The precipitate was collected and washed by water (300 mL), acetone (100 mL) and ethanol (100 mL). It was then dried by a flow of $N_2$ to give a yellow solid (8.57 g, 71%).

Example 3

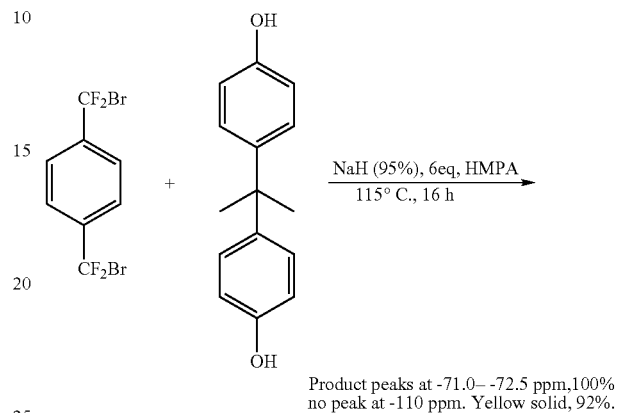

Product peaks at −71.0– −72.5 ppm, 100% no peak at −110 ppm. Yellow solid, 92%.

Bis-Phenol A (3.40 g, 0.015 mol), 1,4-bis-(bromodifluoromethyl)benzene (5.00 g, 0.015 mol), NaH (95%, 1.74 g, 0.073 mol) and hexamethylphosphoramide (anhydrous, 50 mL) was added to a 100 mL round flask. The reaction mixture was stirred at 115° C. for 16 hrs under $N_2$. After the reaction mixture was cooled to room temperature, it was added to water (500 mL) dropwise with stirring. 1 M HCl was added to the solution until pH=1~2. The precipitate was collected and washed by water (100 mL), acetone (30 mL) and ethanol (30 mL). It was then dried by a flow of $N_2$ to give a yellow solid (5.51 g, 91%).

Example 4

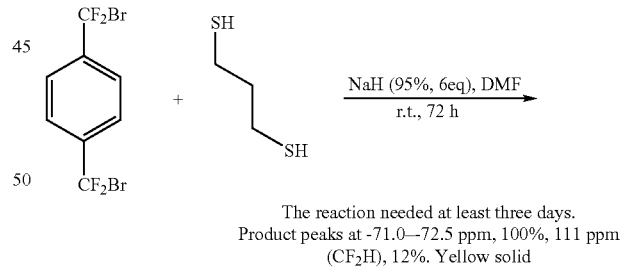

The reaction needed at least three days.
Product peaks at −71.0–−72.5 ppm, 100%, 111 ppm ($CF_2H$), 12%. Yellow solid Propane-1,3-dithiol (1.98 g, 0.018 mol) was added into dimethylformamide (100 mL). Then NaH (95%, 2.64 g, 0.11 mol) was added slowly under $N_2$. The reaction mixture was stirred at room temperature for 1 hr, and 1,4-bis-(bromodifluoromethyl)benzene (6.16 g, 0.018 mol) in dimethylformamide (50 mL) was added. The reaction mixture was stirred at room temperature for 72 hrs. It was added to water (1.5 L) dropwise with stirring. 1 M HCl was added to the solution until pH=1~2. The precipitate was collected and washed by water (200 mL), acetone (30 mL) and ethanol (30 mL). It was then dried by a flow of $N_2$ to give a yellow solid (3.171 g, 61%).

Example 5

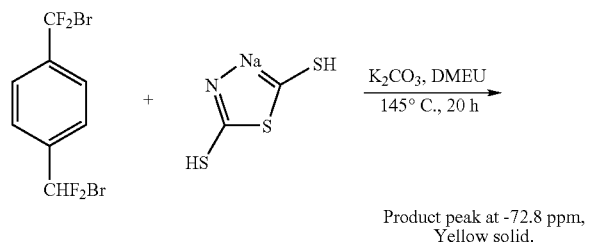

Product peak at -72.8 ppm,
Yellow solid.

1,3,4-Thiadiazole-2,5-dithiol (3.35 g, 0.022 mol), 1,4-bis-(bromodifluoromethyl)benzene (7.50 g, 0.022 mol), $K_2CO_3$ (30.75 g, 0.22 mol) and 1,3-dimethyl-2-imidazolidinone (150 mL) were added to a 250 mL round flask. The reaction mixture was stirred at 145° C. for 20 hrs under $N_2$. After the reaction mixture was cooled to room temperature, it was added to water (1.5 L) dropwise with stirring. 1 M HCl was added to the solution until pH=1~2. The precipitate was collected and washed by water (200 mL), acetone (50 mL) and ethanol (50 mL). It was then dried by flow of $N_2$ to give a yellow solid (4.32 g, 59%).

Examples 6 through 10 illustrate similar approach as examples 1-5, using various processing conditions as indicated.

Example 11

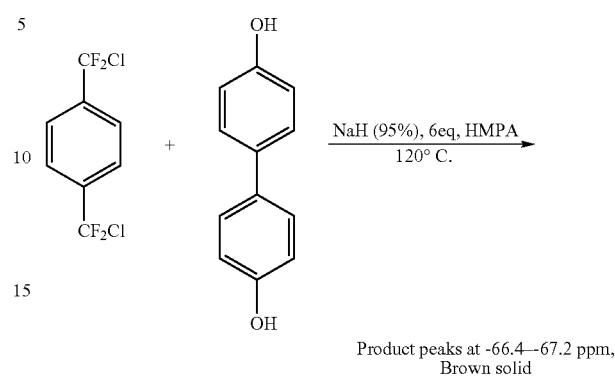

Product peaks at -66.4–-67.2 ppm,
Brown solid 4,4'-biphenol (0.75 g, 4.0 mmol), 1,4-bis-(chlorodifluoromethyl)benzene (1.0 g, 4.0 mmol), NaH (95%, 0.58 g, 24 mmol) and hexamethylphosphoramide (anhydrous, 8 mL) were added to a 25 mL round bottomed flask. The reaction mixture was stirred at 120° C. under $N_2$ for 26 hr. After the reaction mixture was cooled to room temperature, it was added to water (80 mL) dropwise with stirring. 1 M HCl was added to the solution until pH=1~2. The precipitate was col-

| Example # | Precursor | Initial step | Reaction Conditions |
|---|---|---|---|
| Example 6 | HS~~~SH | NaH (6 eq), 1 hr | $CH_3CN$, 70° C., 89 hrs |
| Example 7 |  | NaH (6 eq), 1 hr | DMF, 48 hrs, RT |
| Example 8 | HO-C6H4-CO-C6H4-OH | $K_2CO_3$ (5 eq), DMEU | DMEU, 180° C., 17 hrs |
| Example 9 | HO-C6H4-C(CH3)2-C6H4-OH | NaH (6 eq) | DMF, 96° C., hv, 15.5 hrs |
| Example 10 | HS-thiadiazole-SH | $K_2CO_3$ (10 eq)/ NMP/Toluene, 145° C., 3 hrs | 170° C., 1.5 hrs | lected and washed by water (50 mL) and acetone (10 mL). It was then dried by a flow of $N_2$ to give a brown solid (1.35 g, 91%).

Example 12

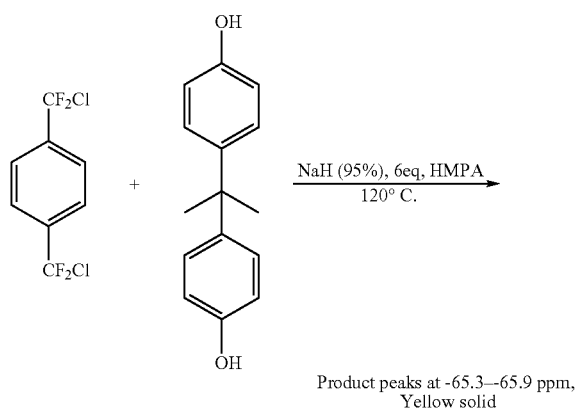

Product peaks at −65.3—−65.9 ppm, Yellow solid

Bis-Phenol A (0.69 g, 3.0 mmol), 1,4-bis-(chlorodifluoromethyl)benzene (0.75 g, 3.0 mmol), NaH (95%, 0.44 g, 18 mmol) and hexamethylphosphoramide (anhydrous, 8 mL) were added to a 25 mL round bottomed flask. The reaction mixture was stirred at 120° C. under $N_2$ for 18 hr. After the reaction mixture was cooled to room temperature, it was added to water (80 mL) dropwise with stirring. 1 M HCl was added to the solution until pH=1~2. The precipitate was collected and washed by water (50 mL) and acetone (10 mL). It was then dried by a flow of $N_2$ to give a brown solid (1.0 g, 81%).

Example 13

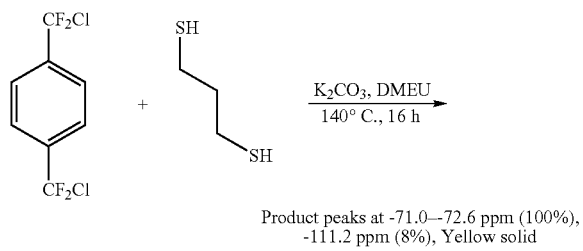

Product peaks at −71.0—−72.6 ppm (100%), −111.2 ppm (8%), Yellow solid

Propane-1,3-dithiol (0.50 g, 4.6 mmol), 1,4-bis-(chlorodifluoromethyl)benzene (1.13 g, 4.6 mmol), ), $K_2CO_3$ (3.16 g, 23 mmol) and 1,3-dimethyl-2-imidazolidinone (15 mL) was added to a 25 mL round bottomed flask. The reaction mixture was stirred at 180° C. under $N_2$ for 18 hrs. After the reaction mixture was cooled to room temperature, it was added to water (100 mL) dropwise with stirring. 1 M HCl was added to the solution until pH=1~2. The precipitate was collected and washed by water (50 mL) and acetone (10 mL). It was then dried by a flow of $N_2$ to give a brown solid (1.12 g, 87%).

Example 14

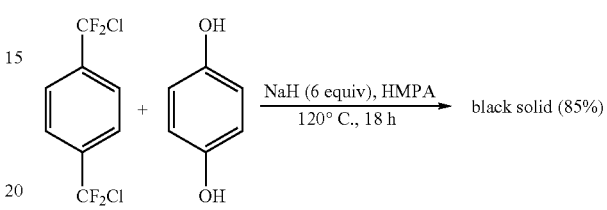

A mixture of hydroquinone (0.22 g, 2.0 mmol), 1,4-bis-(chlorodifluoromethyl)benzene (0.50 g, 2.0 mmol), and NaH (95%, 0.29 g, 12 mmol), in hexamethylphoramide (8 mL) was stirred at 120° C. under $N_2$ for 18 hrs. After the mixture was cooled to room temperature, it was added to water (80 mL) very slowly. The precipitate was filtered and washed by water (50 mL) and acetone (10 mL). It was then dried by a flow of $N_2$ to give a black solid (0.49 g, 85%).

Comparative Example 1

Bis-Phenol A (0.35 g, 1.49 mmol), NaH (95%, 0.36 g, 8.93 mmol) and acetonitrile (anhydrous, 10 mL) were added to a 25 mL round flask and stirred for 1 hr at 60° C. Then 1,4-bis-(bromodifluoromethyl)benzene (0.50 g, 1.49 mmol) was added and the reaction mixture stirred at 60° C. for 16 hrs under $N_2$. After cooling the mixture, a 19F NMR spectrum of the crude reaction mixture indicated that mostly starting material remained.

Comparative Example 2

Propane-1,3-dithiol (0.98 g, 8.9 mmol) and 1,4-bis-(bromodifluoromethyl)benzene (3.0 g, 8.9 mmol) were added to a 25 mL flask, and then N-methylpyrrolidone (10 mL) and NaOH (1.5 g, 0.26.8 mmol) were added under $N_2$. The reaction mixture was then heated at 104° C. for 4 days. After this time, a $^{19}F$ NMR of the reaction mixture indicated the reaction was incomplete (30% starting material). Also considerable (25%) reduction product ($CF_2H$) was observed.

|  | Example 8 | Example 11 | Example 12 | Example 13 | Example 14 |
|---|---|---|---|---|---|
| 19F NMR (δ) | −72.4 to 73.0 | −65.6 to −67.4 | −63.5 to −66.0 | −66.8 to −68.4 | — |
| Mw (g/mol) |  | 13,400 | 36,300 | 15,600 | 37,800 |
| 5% weight loss | 370 | 291 | 294 | 200 |  |
| 10% weight loss (TGA) | 440 | 361 | 366 | 237 |  |

All patents, patent applications, provisional applications, and publications referred to or cited herein are incorporated by reference in their entirety to the extent they are not inconsistent with the explicit teachings of this specification.

We claim:

1. A fluoropolymer prepared from:
   a difunctional monomer plus a p-bis-(halodifluoromethyl) benzene comonomer, either alone or in combination with a dihalogenated monomer.

2. The polymer according to claim 1, where the dihalogenated monomer can be described by one of the following formulae:

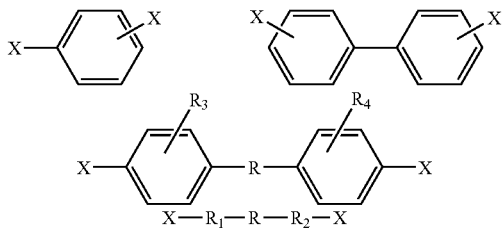

where X=Cl, Br, I, F;

R is a linear or branched alkyl chain, a heteroatom or a group;

$R_1$ and $R_2$ are linear or branched alkyl chains that can contain a heteroatom; and wherein $R_3$ and $R_4$ can be the same or different inert substituent groups such as hydrogen, alkyl groups with 1-4 carbon atoms, or a halogen atom;

and wherein the difunctional monomer can be described by one of the following formulae:

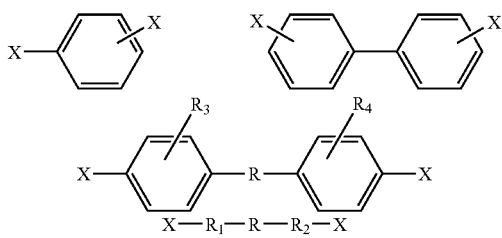

where X=OH or SH, where R is a linear or branched alkyl chain, a heteroatom or a group where $R_1$ and $R_2$ are linear or branched alkyl chains that can contain a heteroatom, wherein $R_3$ and $R_4$ can be the same or different inert substituent groups such as hydrogen, alkyl groups with 1-4 carbon atoms or a halogen atom.

3. The polymer according to claim 2, wherein R includes a heteroatom.

4. The polymer according to claim 2, wherein R includes an aromatic group.

5. The polymer, according to claim 1, wherein the p-bis-(halodifluoromethyl) benzene is p-bis-(chlorodifluoromethyl)benzene or p-bis-(bromodifluoromethyl) benzene.

6. The polymer, according to claim 1, wherein the difunctional monomer is selected from the group consisting of diols and dithiols.

7. The polymer, according to claim 6, wherein the difunctional monomer is selected from the group consisting of 1,2-dihydroxy ethane; 1,3-dihydroxy propane; bisphenol A; 4,4'-dihydroxybiphenyl; 3,3'-dihydroxybiphenyl; and m-cresol.

8. The polymer, according to claim 7, wherein the difunctional monomer is selected from the group consisting of ethane-1,2-dithiol; propane-1,3-dithiol; biphenyl-4,4'-dithiol; benzene-1,3-dithiol; and alkyl-α,ω-dithiols.

9. A method for making a polymer having p-bis-(halodifluoromethyl) benzene units, comprising:
   polycondensing and polymerizing p-bis-(halodifluoromethyl)benzene with one or more dihalogenated monomers and one or more difunctional monomers.

10. The method according to claim 9, wherein dihalogenated monomer can be described by one of the following formulae:

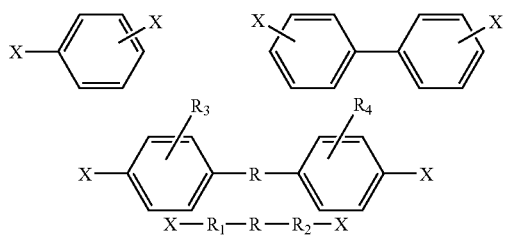

where X=Cl, Br, I, F;

R is a linear or branched alkyl chain, a heteroatom or a group;

$R_1$ and $R_2$ are linear or branched alkyl chains that can contain a heteroatom; and wherein $R_3$ and $R_4$ can be the same or different inert substituent groups such as hydrogen, alkyl groups with 1-4 carbon atoms, or a halogen atom;

and wherein the difunctional monomer can be described by one of the following formulae:

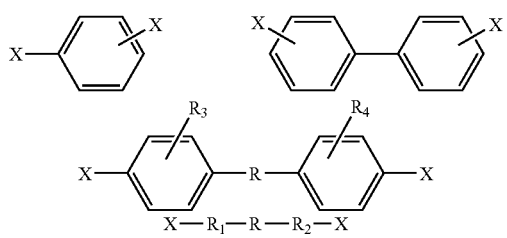

where X=OH, or SH where R is a linear or branched alkyl chain, a heteroatom or a group where $R_1$ and $R_2$ are linear or branched alkyl chains that can contain a heteroatom, wherein $R_3$ and $R_4$ can be the same or different inert substituent groups such as hydrogen, alkyl groups with 1-4 carbon atoms or a halogen atom.

11. The method according to claim 10, wherein the difunctional monomer is selected from the group consisting of 1,2-dihydroxy ethane; 1,3-dihydroxy propane; bisphenol A; 4,4'-dihydroxybiphenyl; 3,3'-dihydroxybiphenyl; and m-cresol.

12. The method according to claim 10, wherein the difunctional monomer is selected from the group consisting of ethane-1,2-dithiol; propane-1,3-dithiol; biphenyl-4,4'-dithiol; benzene-1,3-dithiol; and alkyl-α,ω-dithiols.

13. The method according to claim 9, wherein the polycondensing and polymerizing is conducted in the presence of a base and a polar aprotic solvent mixed with toluene or chlorobenzene.

14. The method according to claim 13, wherein the base is KOH, KH, or $K_2CO_3$.

15. The method according to claim 13, wherein the polar aprotic solvent is DMF, NMP, or DMSO.

16. The method according to claim 9, further comprising controlling the molecular weight and polymer end groups through the ratio of the p-bis-(chlorodifluoromethyl) benzene monomer or p-bis-(bromodifluoromethyl) benzene monomer and the difunctional monomer.

17. The method according to claim 16, wherein controlling the molecular weight and polymer end groups further comprises adding 4-chlorobenzophenone or anisole.

18. The method according to claim 9, further comprising controlling the molecular weight and polymer end groups by adding a mono-functional monomer.

* * * * *

UNITED STATES PATENT AND TRADEMARK OFFICE
CERTIFICATE OF CORRECTION

PATENT NO. : 7,544,765 B2  Page 1 of 1
APPLICATION NO. : 11/546729
DATED : June 9, 2009
INVENTOR(S) : William R. Dolbier, Jr. et al.

It is certified that error appears in the above-identified patent and that said Letters Patent is hereby corrected as shown below:

Column 1, Line 32
"synthesis of 1,1'4,4'" should read --synthesis 1,1' 4,4'--

Column 9, Lines 5-10, Example 5
" 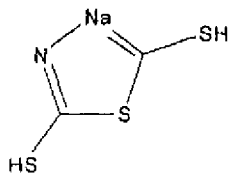 " should read  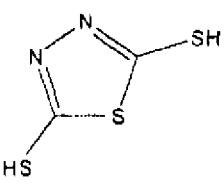 --

Column 12, Line 51
"a $^{19}$F NMR" should read --a 19F NMR--

Signed and Sealed this

Twenty-fifth Day of August, 2009

David J. Kappos
*Director of the United States Patent and Trademark Office*